United States Patent
Isard et al.

[15] 3,678,102
[45] July 18, 1972

[54] α,α,α',α'-TETRASUBSTITUTED CARBOXYLIC DIACIDS AND PROCESS FOR THEIR PREPARATION

[72] Inventors: Arsene Isard, Saint-Genis-Laval; Francis Weiss, Pierre-Benite, both of France

[73] Assignee: Ugine Kuhlmann, Paris, France

[22] Filed: Sept. 11, 1970

[21] Appl. No.: 71,377

Related U.S. Application Data

[63] Continuation of Ser. No. 591,135, Nov. 1, 1966, abandoned.

[30] Foreign Application Priority Data

Nov. 5, 1965 France..................................6537347
May 3, 1966 France..................................6659972

[52] U.S. Cl.......................260/514 R, 260/75 R, 260/75 UA, 260/78 R, 260/78 UA, 260/345.7, 260/345.8, 260/468 R, 260/468 B, 260/469, 260/473 R, 260/488 H, 260/519 B, 260/515 A, 260/515 P, 260/520, 260/537 N, 260/537 R

[51] Int. Cl. ................C07c 57/02, C07c 61/16, C07c 63/60

[58] Field of Search....................260/514, 515, 537 B, 537 U, 260/514, 515 P, 537, 537 V

[56] References Cited

OTHER PUBLICATIONS

Arnold et al. Jacs 71, 1150 (1949).

Brannock et al., J.O.C, 25 1815 (1960).

*Primary Examiner*—Lorraine A. Weinberger
*Assistant Examiner*—Robert Gerstl
*Attorney*—Webb, Burden, Robinson & Webb

[57] ABSTRACT

An α,α,α',α'-tetrasubstituted γ-methylene (and γ-methyl) pimelic acid of the general formulas:

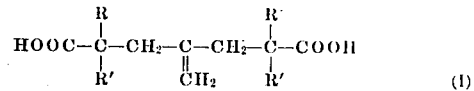

(I)

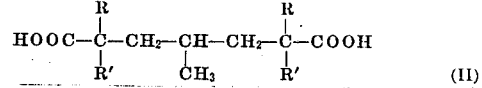

(II)

And a process for preparing diacid (I) by reacting in an anhydrous medium a diester of the general formula:

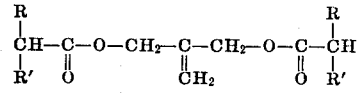

with a Grignard reagent R″MgX or with an alkaline metal hydride, amide or alcoholate and then neutralizing and separating. Diacid II being prepared by reduction of diacid (I) such as by catalytic hydrogenation.

4 Claims, No Drawings

α,α,α',α'-TETRASUBSTITUTED CARBOXYLIC DIACIDS AND PROCESS FOR THEIR PREPARATION

This application is a continuation of Ser. No. 591,135 filed Nov. 1, 1966 and now abandoned.

The invention relates to:

1. As new industrial products, the α,α,α',α'-tetrasubstituted γ-methylene (and γ-methyl)pimelic acids of the formulas:

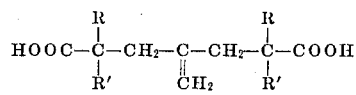

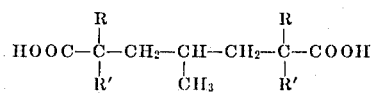

in which R and R' represent a member selected from the group consisting of a lower alkyl group such as methyl, ethyl, n-propyl, isopropyl, n-butyl, secondary-butyl, isobutyl, terbutyl, an arylaliphatic group, such as phenylmethyl, phenylethyl, an aromatic group such as phenyl, a substituted phenyl, p-chlorophenyl, p-methoxy phenyl.

R and R' may be reunited through one or two carbon-carbon bonds or carbon-heteroatom (oxygen or nitrogen) bonds to form a divalent radical having from two to 11 carbon atoms, saturated or containing olefinic double bonds, eventually substituted by substituents inert towards the alkaline agents utilized in the reaction, for example, alkyl, aryl groups, ether functions, etc.

2. A process for the preparation of (1) which comprises reacting, in an anhydrous medium, a diester of 2-methylene 1,3-propanediol of the formula:

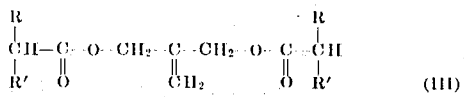

in which R and R' have the same meaning as above, with a reagent selected from the group comprising the hydrides, amides or alcoholates of alkaline metals, such as potassium or sodium hydrides, lithium, sodium or potassium amides, sodium or potassium methylate, ethylate or terbutylate, or a Grignard reagent of formula R"MgX, wherein R" is an alkyl or aryl radical and X a halogen atom other than fluorine, then neutralizing with a strong inorganic acid and separating acid (1) from the reaction mixture.

3. A process for preparing (II) which comprises reducing, in a known manner, diacid (I), for example by catalytic hydrogenation.

Examples of carboxylic acids utilizable for the preparation of diesters, which are the raw materials of the present invention are:

(1) the disubstituted acetic acids RR'CH-COOH such as dialkyl-alkyl-aryl or diarylacetic acids (2) the cycloalkane carboxylic acids

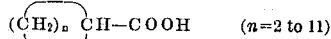

and their substituted derivatives, for instance mono-, di-, or trialkyl;

(3) the cycloalkene carboxylic acids, for instance, the cyclohexene carboxylic acids which may be obtained by dienic synthesis from a conjugated diolefin and an acrylic acid

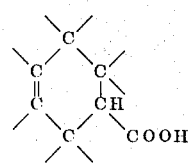

(4) the dihydro-pyran carboxylic and tetrahydropyran carboxylic acids

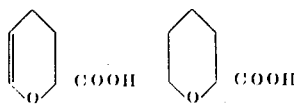

(5) the dicyclic or polycyclic acids prepared by dienic synthesis from an acrylic acid

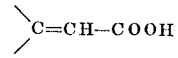

and from a cyclic diene, for instance, cyclopentadiene, 1,3-cylcohexadiene, anthracene, furan, etc., such as:

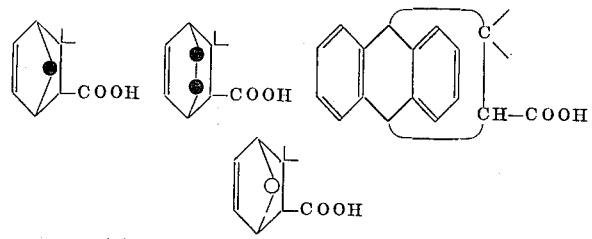

or the corresponding saturated acids.

It is known that the allylic or methallylic esters of dialkyl-, alkylaryl-, or diarylacetic acids of the formula
RR'CH — COO — CH$_2$ — CR''' $=$ CH$_2$ (R''' = H or CH$_3$)
are rearranged into allylacetic or methallylacetic monoacids of the formula
CH$_2$ $=$ CR''' — CH$_2$ — CRR' — COOH Under the action of the above mentioned agents (see, for example, J. Am. Chem. Soc. 1949, 71 pp. 1150 and 2439; J. Org. Chem. 1960, 25, 1815; U.S. Pat. No. 2,526,108 of Dec. 31, 1947). The applicants have found that under similar conditions the diesters of formula (III) were rearranged into diacids of formula (I). It may be supposed, but this is only a hypothesis, that the mechanism of the reaction is similar, which then implies a new and unexpected phenomenon, since the same allylic structure is then utilized in two rearrangements with both ester functions. Indeed, it is possible to schematically write, if the alkaline reagent intervention is not taken into account:

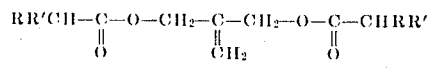

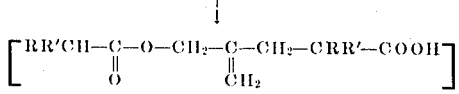

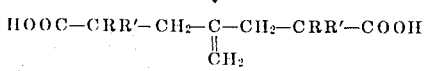

Thus, this new phenomenon leads in a simple manner to α, α, α', α'-tetrasubstituted diacids, which are most interesting intermediate products for synthesis, for example, for the preparation of polyamides, polyesters, dialkyl esters used as plasticizers or lubricants resistant to hydrolysis, etc.

The reaction is carried out, for instance, by progressively adding diester (III), as it is or in solution, to a suspension, dispersion or solution (as the case may be) of the alkaline or Grignard reagent in an inert solvent. To render the reaction more economical and simpler, it is particularly advantageous to use sodium hydride or amide. As a salt of the diacid is obtained during this rearrangement, it is preferable to use the alkaline metal derivative in at least stoichiometric amounts, in order to ensure an optimum transformation of the diester. In practice, an amount equal to, or slightly higher, for instance, by 10–25 percent, than the theoretical amount will be utilized, that is approximately 2 to 2.5 alkaline equivalents per mole of diester. The solvent utilized may be chosen, from the aliphatic or aromatic hydrocarbons such as hexane, cyclohexane, mineral oil, benzene, toluene, xylenes, aliphatic or cyclic ethers such as dialkyl ethers of ethylene or diethylene glycol, tetrahydrofuran, dioxane. As an indication, the amount of necessary solvent is approximately one to five times, by weight, greater than the amount of ester utilized.

The reaction is preferably carried out at a temperature above room temperature, for example, between 30° and 180° C. Thus, it is possible to execute the addition at a moderate temperature, 30°–80° C, and then to end with a reflux heating, or to operate from the beginning of the addition at the reflux temperature of the mixture.

When the reaction is completed, the excess of alkaline reagent is eventually destroyed, for instance, by adding a little methanol or ethanol, then the salt of diacid (I) is neutralized by addition of a strong inorganic acid, such as hydrochloric or sulphuric acid, etc., in the usual way. The process depends essentially on the nature of the solvent used in the reaction. Indeed, it is possible to remain in an anhydrous medium and to operate with dry gaseous hydrochloric acid; in this case, the diacid remains in solution and the alkaline chloride precipitates, the precipitate is filtered and the diacid is collected by evaporation. It is also possible to neutralize with an aqueous acid; then, according to whether or not the solvent is soluble in water, a homogeneous solution or a heterogeneous mixture of both liquid phases is obtained, wherefrom the diacid is extracted with a solvent immiscible in water.

Afterwards, the saturated diacid (II) may be prepared by a known manner, by catalytic hydrogenation of the acid or of its salts, in the presence of usual catalyst, such as reduced nickel, Raney nickel, a precious metal such as palladium, ruthenium, etc.

The following nonlimiting examples illustrate the process for preparing the new compounds of the invention.

EXAMPLE 1

Preparation of $\alpha,\alpha,\alpha',\alpha'$-tetramethyl $\gamma$-methylene pimelic acid (4-methylene 2,2,6,6-tetramethyl heptanedioic acid).

16.5g of a dispersion containing 43.4 percent by weight of sodium hydride in vaseline oil (0.3 mole NaH) and 50 cm³ of the dimethyl ether of diethylene glycol (2,5,8-trioxanonane) were placed into a flask and maintained under an inert atmosphere by a current of pure nitrogen. After heating the mixture to 60° C, 34.2g (0.15 mole) of di-isobutyrate of the 2-methylene, 1,3-propanediol diluted in 10 cm³ of dimethyl ether of diethylene glycol were introduced therein. The introduction, executed while the mixture was strongly agitated, lasted 45 minutes during which the temperature was progressively raised to 130° C. The heating was continued for 45 minutes at 130° C, then 90 minutes at 160° C. After cooling and an addition of 15 cm³ of anhydrous methanol to destroy the unreacted sodium hydride, water was added to the mixture and neutralized by an addition of a theoretical amount of hydrochloric acid. The aqueous solution was saturated by sodium chloride, then extracted three times with 100 cm³ ether. The evaporated etheric solution was collected, then the dimethyl ether of diethylene glycol was distilled. There remained 26g of the raw reaction product, partly crystallized, wherefrom the $\gamma$-methylene $\alpha,\alpha,\alpha',\alpha'$-tetramethyl pimelic acid was separated by successive recrystallizations in hot water. A purified fraction weighing 13g (0.057 mole) appeared as colorless crystals, melting at 95°–96° C, and its analysis gave the following results:

|  | C | H |
|---|---|---|
| Elementary analysis |  |  |
| (calculated in % by weight: | 63.13 | 8.83 |
| (found in % by weight: | 62.97 | 8.72 |

Acidity estimation:
0.886 equivalent/100g (calculated: 0.876)
Double linkage estimation:
0.439 equivalent/100g (calculated: 0.438)

The infra-red spectrum presented the characteristic absorption bands of the double linkage at 1,640 and 3,090 cm⁻¹.

By evaporation of the mother-waters of the crystallization, a 6g mixture was obtained. The chemical analysis and the infrared spectrum showed the presence of esters and carboxylic acid groups, which proved that the mixture was formed of partly transformed products.

EXAMPLE 2

Preparation of 2,2,4,6,6-pentamethyl heptanedioic acid.

4g of 4-methylene 2,2,6,6-tetramethyl heptanedioic acid were dissolved in 100 cm³ NaOH N/5 and this solution was hydrogenated by heating for 9 hours at 150° C, under 160 atm. hydrogen, in the presence of 1g of carbon containing 5 percent metallic ruthenium. By acidifying the reaction mixture, the 2,2,4,6,6-pentamethyl heptanedioic acid was precipitated with a yield of 90 percent (36g): colorless crystals, melting at 129°–130° C.

EXAMPLE 3

Preparation of 4-methylene 2,2,6,6-tetraphenyl heptanedioic ($\gamma$-methylene $\alpha,\alpha,\alpha',\alpha'$-tetraphenyl pimelic acid).

The bis-diphenylacetate of 2-methylene 1,3-propanediol utilized was prepared by action of diphenylacetyl chloride on the diol; the diester is a crystallized colorless compound melting at 45°–48° C.

11g of a 43.4 percent sodium hydride by weight dispersion in vaseline oil (0.2 mole NaH) and 50 cm³ of the dimethyl ether of diethylene glycol were placed in a flask and maintained under an inert atmosphere by a current of pure nitrogen. The temperature was brought to 60° C; then 19g diester (0.04 mole) was introduced and diluted by 20 cm³ of dimethyl ether of diethylene glycol, within one hour. During the addition, the temperature was raised to 90° C. Then the heating as pursued for 30 minutes, up to a final temperature of 130° C. After cooling and an addition of 10 cm³ methanol to destroy the excess of sodium hydride, 300g water was added and the oily layer which had been formed was separated. The aqueous phase was acidified by addition of hydrochloric acid, extracted with diethylether and the extract was evaporated. 13g of raw 4-methylene 2,2,6,6-tetraphenyl heptanedioic was obtained. By washing this product with cyclohexane and recrystallizing in chloroform a purified sample of this diacid was obtained which melted at 204°–206° C and which, through analyses by acidimetry, by estimation of the double bonds, and by infra-red spectrometry, proved to be in accordance with the indicated structure. This diacid gave a salt of S-benzyl isothiouronium melting at 160°–170° C, with decomposition.

EXAMPLE 4

Preparation of bis 1,3-(1-carboxy 3-cyclohexene-yl) 2-methylene propane

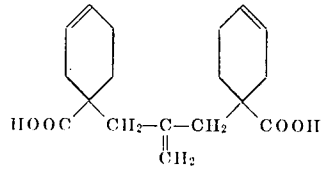

The bis-3-cyclohexene carboxylic ester of 2-methylene 1,3-propanediol was utilized (Eb₁ = 175°–181° C; $n_D$ = 1,500; $d_4$ = 1,090)

Placed in a flask were 28g of 43.4 percent by weight sodium hydride dispersion in vaseline oil (0.5 mole NaH) and 40 cm³ dimethyl ether of diethylene glycol and maintained under an inert atmosphere by a current of pure nitrogen. The temperature was brought to 60° C, then 30.4g of diester (0.1 mole) was introduced, diluted by 20 cm³ of dimethylene of diethylene glycol, within one hour and 40 minutes. During the addition the temperature was raised to 90° C. At the end of the introduction, a supplementary amount of 50 cm³ of solvent was added to increase the fluidity of the mixture which had become very thick, in order to improve its stirring. The mixture was maintained for 6 hours at 100°–120° C, then cooled and 20 cm³ methanol was added to destroy the sodium hydride excess, and 150 cm³ water was added. An oily layer was decanted, then the aqueous phase was acidified by hydrochloric acid. 28g of raw diacid precipitated, as brownish crystals. This product was dissolved in 200 cm³ ethanol, added with water until a turbidity appeared and let stand during the night. After filtration, 15g of slightly colored acid was obtained, then purified by recrystallization in white spirit: the product melted at 163°–164° C; the analyses by acidimetry, by estimation of the double bonds and by infra-red spectrometry were in accordance with the indicated structure.

While we have described certain presently preferred embodiments of our invention, it may be otherwise embodied within the scope of the appended claims.

What we claim as our invention is:

1. α,α,α',α',-tetrasubstituted carboxylic diacid having the formula

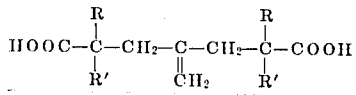

in which R and R' form a divalent radical containing from two to 11 carbon atoms from radicals selected from the group consisting of alkylene, alkenylene, alkadienylene, and alkatrienylene.

2. α,α,α',α',-tetrasubstituted carboxylic diacid having the formula

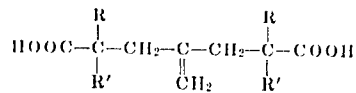

in which R and R' represent a member selected from the group consisting of a lower alkyl having from one to four carbon atoms, phenylmethyl, phenylethyl, phenyl, p-chlorophenyl and p-methoxyphenyl.

3. α,α,α',α',-tetrasubstituted carboxylic diacid having the formula

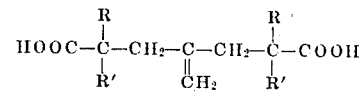

in which R and R' form a divalent radical containing from two to 11 carbon atoms from alkylene.

4. The diacid as set forth in claim 3 wherein said alkylene is cyclohexene.

* * * * *

UNITED STATES PATENT OFFICE
CERTIFICATE OF CORRECTION

Patent No. 3,678,102     Dated July 18, 1972

Inventor(s)   Arsene Isard and Francis Weiss

It is certified that error appears in the above-identified patent and that said Letters Patent are hereby corrected as shown below:

Column 2 Line 31 --CR''' CH$_2$-- should read --CR'''=CH$_2$--. Column 4 Line 2 --1.640 and 3.090-- should read --1640 and 3090--.
Column 4 Line 65 --n$_D$-- should read --n$_D^{20}$--.
Column 4 Line 65 --d$_4$-- should read --d$_4^{20}$--.

Signed and sealed this 12th day of December 1972.

(SEAL)
Attest:

EDWARD M. FLETCHER, JR.
Attesting Officer

ROBERT GOTTSCHALK
Commissioner of Patents